(12) United States Patent
You et al.

(10) Patent No.: US 7,409,222 B2
(45) Date of Patent: Aug. 5, 2008

(54) METHOD OF ADJUSTING POWER OF FORWARD LINK SIGNAL

(75) Inventors: Cheol Woo You, Seoul (KR); Ki-Jun Kim, Seoul (KR); Young Jo Lee, Kunpo-shi (KR)

(73) Assignee: LG Electronics Inc., Seoul (KR)

(*) Notice: Subject to any disclaimer, the term of this patent is extended or adjusted under 35 U.S.C. 154(b) by 429 days.

(21) Appl. No.: 10/310,795

(22) Filed: Dec. 6, 2002

(65) Prior Publication Data

US 2003/0109221 A1    Jun. 12, 2003

(30) Foreign Application Priority Data

Dec. 7, 2001    (KR)    ............... 10-2001-0077323

(51) Int. Cl.
*H04B 7/00*    (2006.01)

(52) U.S. Cl. ........................... 455/522; 455/69

(58) Field of Classification Search ............... 455/13.4, 455/522, 69
See application file for complete search history.

(56) References Cited

U.S. PATENT DOCUMENTS

| | | | | |
|---|---|---|---|---|
| 4,777,653 A * | 10/1988 | Bonnerot et al. | ............... | 455/69 |
| 5,465,269 A * | 11/1995 | Schaffner et al. | ............ | 375/144 |
| 5,751,763 A * | 5/1998 | Bruckert | ................ | 375/141 |
| 6,075,974 A * | 6/2000 | Saints et al. | ................ | 455/69 |
| 6,898,193 B2 * | 5/2005 | Saifuddin | ............... | 370/326 |
| 2004/0087331 A1 * | 5/2004 | Hwang et al. | ............... | 455/522 |

* cited by examiner

*Primary Examiner*—Matthew Anderson
*Assistant Examiner*—Perez M Angelica
(74) *Attorney, Agent, or Firm*—KED & Associates, LLP (57) ABSTRACT

A forward-link power control method is disclosed. The forward power control is performed by receiving at least one reverse link channel that informs channel quality information of a forward link, and determining a power of a channel to be transmitted to the forward link according to the channel quality information.

23 Claims, 5 Drawing Sheets

METHOD OF ADJUSTING POWER OF FORWARD LINK SIGNAL

This application claims the benefit of the Korean Application No. P01-77323 filed on Dec. 7, 2001, which is hereby incorporated by reference.

BACKGROUND OF THE INVENTION

1. Field of the Invention

The present invention relates to a mobile communication system, and more particularly to a method of adjusting a power of a forward link signal.

2. Background of the Related Art

Generally, in a radio communication system, a power control of a physical channel for transmitting data is performed to maintain the communication quality of the transmitted data. The power control method is classified into an outer loop power control and an inner loop power control.

In the outer loop power control method, a receiving end measures the frame quality of the present data frame of the physical channel subject to the power control. Also, the receiving end adjusts a target value of a ratio of a received signal to noise signal power ratio according to the degree of the measured frame quality. Herein, the frame generally means a unit of data transmitted through the physical channel. For example, it may be a unit for performing one error correction encoding.

In the inner loop power control method, the receiving end calculates a ratio of the received signal to noise signal power during a transmission period of the present power control group (PCG) of the physical channel subject to the power control. Also, at this time, the receiving end compares the ratio of the received signal to noise signal power for the present PCG with the target value, and commands a control (for example, transmission power increasing/decreasing command) of a transmission power of the physical channel according to a result of comparison.

A transmitting end performs a specified operation with respect to the transmission power of the physical channel based on the command for the power control. Herein, the PCG indicates the power control unit, and in case of the power control with 800 Hz, the length of one PCG becomes $1/800 (=1.25$ msec).

However, the conventional inner loop power control has the following problems.

If the transmitting end transmits data through the physical channel to the receiving end, the receiving end should calculate a ratio of the received signal to noise signal power for the physical channel. At this time, the accuracy of the ratio is in close connection with an increase in an efficiency of the power control.

Since it is very difficult to accurately calculate the power of all or a portion of the signal received through a physical channel, this causes a decrease in an efficiency of the power control. Especially, if the power of the received signal is variable or the power's value is less than as usual, the power value of the received signals obtained by the receiving end becomes more inaccurate.

Also, the conventional outer loop power control has the following problems.

If the transmitting end transmits data through the physical channel to the receiving end, the receiving end measures the frame quality of frames on the physical channel frame, and adjusts the target value of a ratio of the received signal to noise signal power according to the degree of the measured frame quality. For example, the receiving end detects errors of a certain frame using a cyclic redundancy check (CRC) codes of a certain frame, and if no error exists, it judges that the frame quality of the frame is good, while if an error exists, it judges that the quality of the frame is bad.

However, if information for informing the accurate value of the quality of the frame such as the CRC is not included in the data of the frame, it is difficult to adjust the target value of a ratio of the received signal to noise signal power.

SUMMARY OF THE INVENTION

An object of the present invention is directed to a power control method that substantially obviates one or more problems due to limitations and disadvantages of the related art.

Another object of the present invention is to provide an effective forward-link power control method in a mobile communication system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a forward-link power control method receives at least one reverse link channel that informs the channel quality information of the forward link, and determines the power of the channel to be transmitted to the forward link according to the channel quality information.

In another aspect of the present invention, a method of adjusting a power of a forward link signal, comprises the steps of receiving a channel quality value based on at least one power control group of a forward link reference signal, estimating a parameter for determining a transmission power of the forward link signal using at least one channel quality value for a power control group before a predetermined time, comparing the estimated parameter with a target value, and adjusting a transmission power of a corresponding power control group of the forward link signal according to the comparing result.

In still another aspect of the present invention, a method of adjusting a power of a forward link signal, comprises the steps of receiving a frame quality value based on at least one frame of the forward link signal through a reverse channel, estimating a parameter used to change a target value of a power control using the predetermined number of the received frame quality values before the predetermined time, and adjusting the target value based on the parameter.

In still another aspect of the present invention, a method of adjusting a power of a forward link signal, comprises the steps of receiving a channel quality value based on at least one power control group of a forward link reference signal, judging whether the channel quality value is valid or not, estimating a transmission power of the forward link signal using a parameter of at least one valid channel quality value before the predetermined number of power control groups and a target value used to control a power of the forward link signal, when the channel quality value is valid, comparing a changing amount from a previous transmission power to the estimated transmission power with an upper changeable amount or a lower changeable amount, and determining a transmission power of a corresponding power control group of the forward link signal according to the comparing result.

In still another aspect of the present invention, a method of adjusting a power of a forward link signal, comprises the steps of receiving, on at least one reverse link channel, a signal that informs channel quality information of a forward link channel, and adjusting a power of a channel signal transmitted on the forward link according to the channel quality information.

In still another aspect of the present invention, a method of adjusting a power of a forward link signal comprises the steps of adjusting a transmission power of a channel signal transmitted to a terminal based on at least one information of a first reverse channel quality indication channel and a second reverse channel quality indication channel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1A:
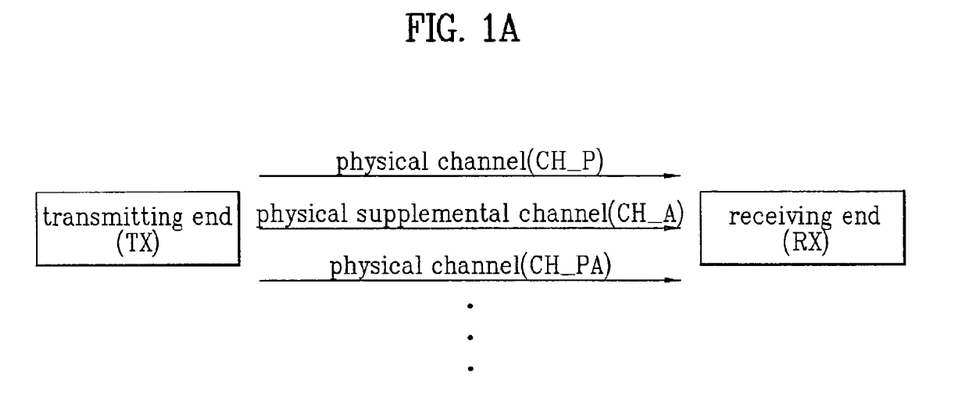
FIGS. 1A and 1B are diagrams illustrating the system construction to which the present invention is applied.
Figure 1B:
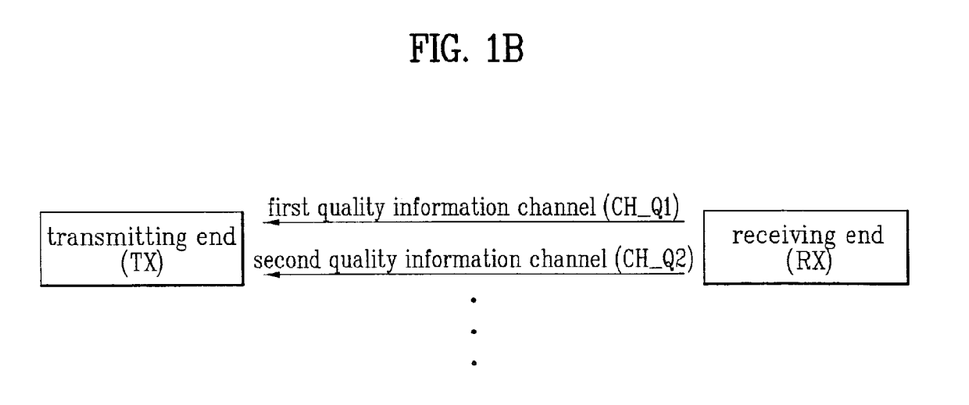

FIGS. 1A and 1B are diagrams illustrating the system construction to which the present invention is applied.

FIG. 1A shows channels through which a transmitting end transmits data to a receiving end.

Referring to FIG. 1A, CH_P means a physical channel that is subject to power control, and can have information necessary for measuring the frame quality such as a cyclic redundancy check (CRC) code in a frame (e.g., information being used for confirming whether the frame is received without error or not).

CH_PA means a physical channel having the information necessary for measuring the frame quality such as the CRC in a frame.

CH_A is a supplemental channel (a type of physical channel) that serves to help so that the receiving end efficiently receives data transmitted from the transmitting end through the channels, for example a pilot channel. The pilot channel is a channel for transmitting the previously known information (or prescribed information) with a relatively large power. Since the supplemental channel has a relatively higher power, the receiving end may obtain a ratio of the received signal to noise signal power of CH_A with a very higher accuracy.

FIG. 1B shows the channels through which a receiving end transmits data to a transmitting end.

The receiving end informs the transmitting end of the channel quality information of frames received from the transmitting end through CH_Q1 and CH_Q2, which may be the physical channels or logic channels according to their useable purpose. Herein, the logic channel means that the channel quality information is transmitted as a part of the information transmitted through a certain physical channel.

Especially, CH_Q1 means the channel for transmitting the quality information of a radio channel environment through which CH_A passes as data transmitted through CH_A from the transmitting end to the receiving end. That is, CH_Q1 means the channel for transmitting the channel quality information of a radio channel. The information transmitted through CH_Q1 may be obtained using CH_A or any channel of a same type of CH_A.

CH_Q2 means the channel for informing the transmitting end of the quality information of the frames (i.e., whether it is a good frame or a bad frame or not) received by the receiving end. The frame quality information is a kind of channel quality information. The frame quality information transmitted through CH_Q2 may be obtained based on the information of CH_P in case that CH_P includes the information such as the CRC which exists in a frame of CH_P, or of CH_PA in case that CH—P does not include the information such as the CRC in a frame of CH_P.

In the system of FIG. 1 as described above, the transmitting end adjusts the transmission power of CH_P based on the information belonging to CH_Q1 and/or CH_Q2.

In FIG. 1, it is assumed that the transmitting end is a base station (BS), and the receiving end is a mobile station (MS). Also, if CH_P has the information used for estimating the frame quality such as CRC, the frame to be explained hereinafter indicates the frame on CH_P, while if CH_P does not have the information such as CRC, the frame to be explained hereinafter indicates the frame on CH_PA.

It is assumed that CH_A is a pilot channel, CH_Q1 is CQI_Ch (Channel Quality Indication Channel), and CH_Q2 is ACK/NAK_Ch (Acknowledgement Channel). Herein, CQI_Ch means the channel for transmitting the channel quality information of a radio channel in communicative environment through which CH_A passes as data transmitted through CH_A from the transmitting end to the receiving end. At this time, as an example of the channel quality information, there is a ratio of a received pilot signal to noise signal power or a total received signal to noise signal power.

Also, ACK/NAK_Ch means the channel for a receiving end so as to inform a transmitting end of whether the corresponding frame (or another kind of unit for quality measurement) on CH_P or CH_PA is transmitted without error from the transmitting end to the receiving end. For example, the information transmitted on ACK/NAK_Ch may include whether the corresponding frame has an error or not.

Figure 2:
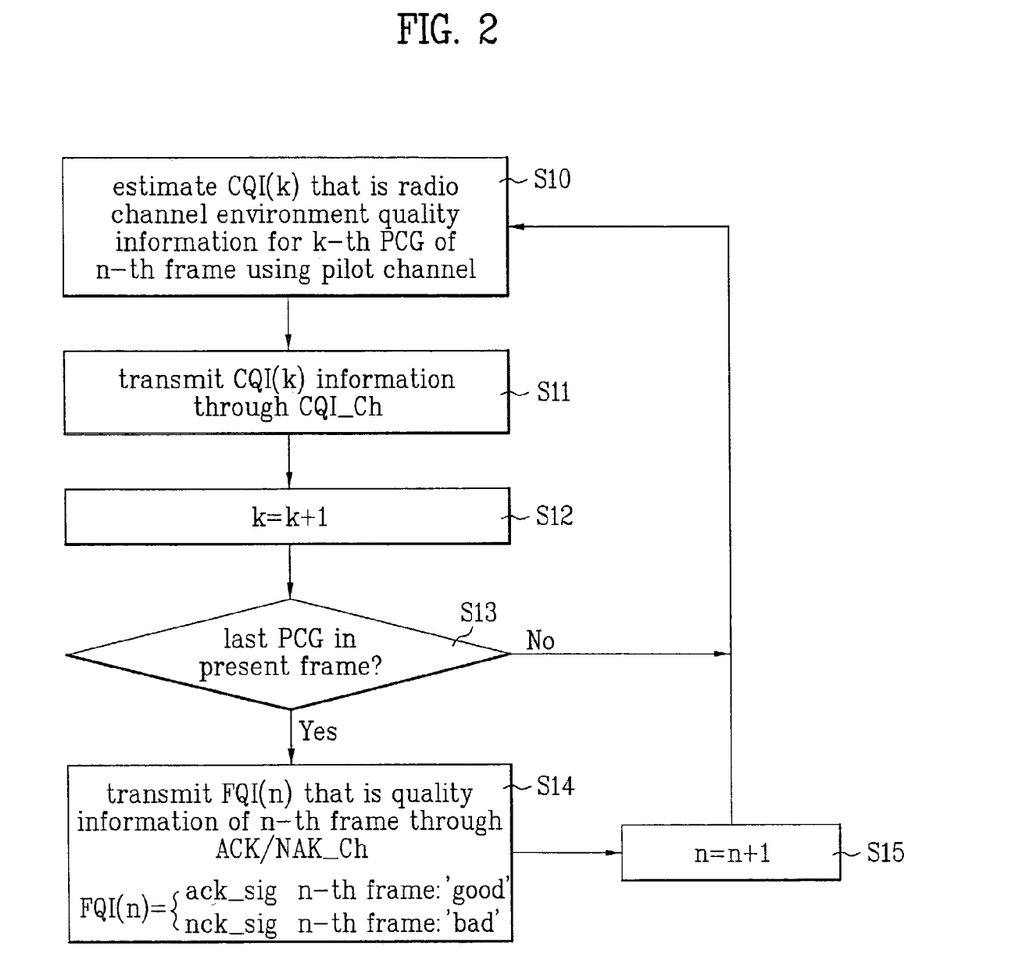
FIG. 2 is a flowchart illustrating a power control procedure of a terminal according to a preferred embodiment of the present invention.

FIG. 2 is a flowchart illustrating a power control procedure of a terminal according to the present invention.

Referring to FIG. 2, CQI(k) means the channel quality information on communicative environment condition of the radio channel during the transmission period of the k-th PCG, and FQI(n) means the quality information of the n-th frame (or another kind of unit for quality measurement) among the frames received by the terminal.

The number of measurement and transmission of CQI(k) and FQI(n) per unit time at the terminal can be adjusted.

The length of a frame is equal to the sum of the lengths of the specified number of PCGs. For example, if the length of a frame is 20 msec and the length of a PCG is 1.25 msec, the length of a frame corresponds to the sum of the lengths of 16 PCGs.

Meanwhile, as an example of FIG. 2, if the quality information transmitted through CQI_Ch is a ratio of the received pilot signal to noise signal power, CQI(k) belonging to the k-th PCG can be expressed as the following equation 1.

$$CQI(k) = \frac{|\alpha(k)|^2 Ep(k)}{Nt(k)} \qquad \text{[Equation 1]}$$

In equation 1, $\alpha(k)$ is a channel coefficient for indicating a condition of communicative environment through which the radio channel passes during a transmission period of the k-th PCG, a state, a signal distortion, etc. Ep(k) is a power of the transmitted pilot signal, and Nt(k) means a power of the noise signal.

Referring to FIG. 2, a receiving end (e.g., a mobile station) estimates CQI(k) that includes the channel quality information on communicative environment condition of the radio channel during the transmission period of k-th PCG of the n-th frame using the pilot channel transmitted from a transmission end (e.g., a base station)(step S10). The equation 1 is used for the estimation. That is, the mobile station estimates CQI(k) including a condition of communicative environment between mobile station and base station, a state, a signal distortion, etc., which are reflected to the transmitted pilot signal power to noise signal power.

The CQI(k) information is transmitted to the base station through CQI_Ch on the radio link (step S11).

The estimation and transmission of CQI(k) is repeatedly performed other PCGs (step S12).

After the estimation and transmission of CQI(k) for all PCGs, it is judged whether the present PCG is the last PCG of the present frame (step S13). If it is the last PCG, FQI(n) that is the quality information of the n-th frame on CH_P or CH_PA is transmitted to the base station through ACK/NAK_Ch on the radio link.

At this time, if the quality condition of the n-th frame is good, FQI(n) is set to 'ACK', and then transmitted (step S14), while if the quality condition is bad, FQI(n) is set to 'NAK', and then transmitted. (step 14)

If the quality information on a condition of communicative environment of the radio channel during the transmission periods of the PCGs of the n-th frame and the frame quality information of the n-th frame to the base station are completely transmitted, the above processes (steps S10 to S14) are repeatedly performed with respect to the (n+1)-th frame.

Figure 3:
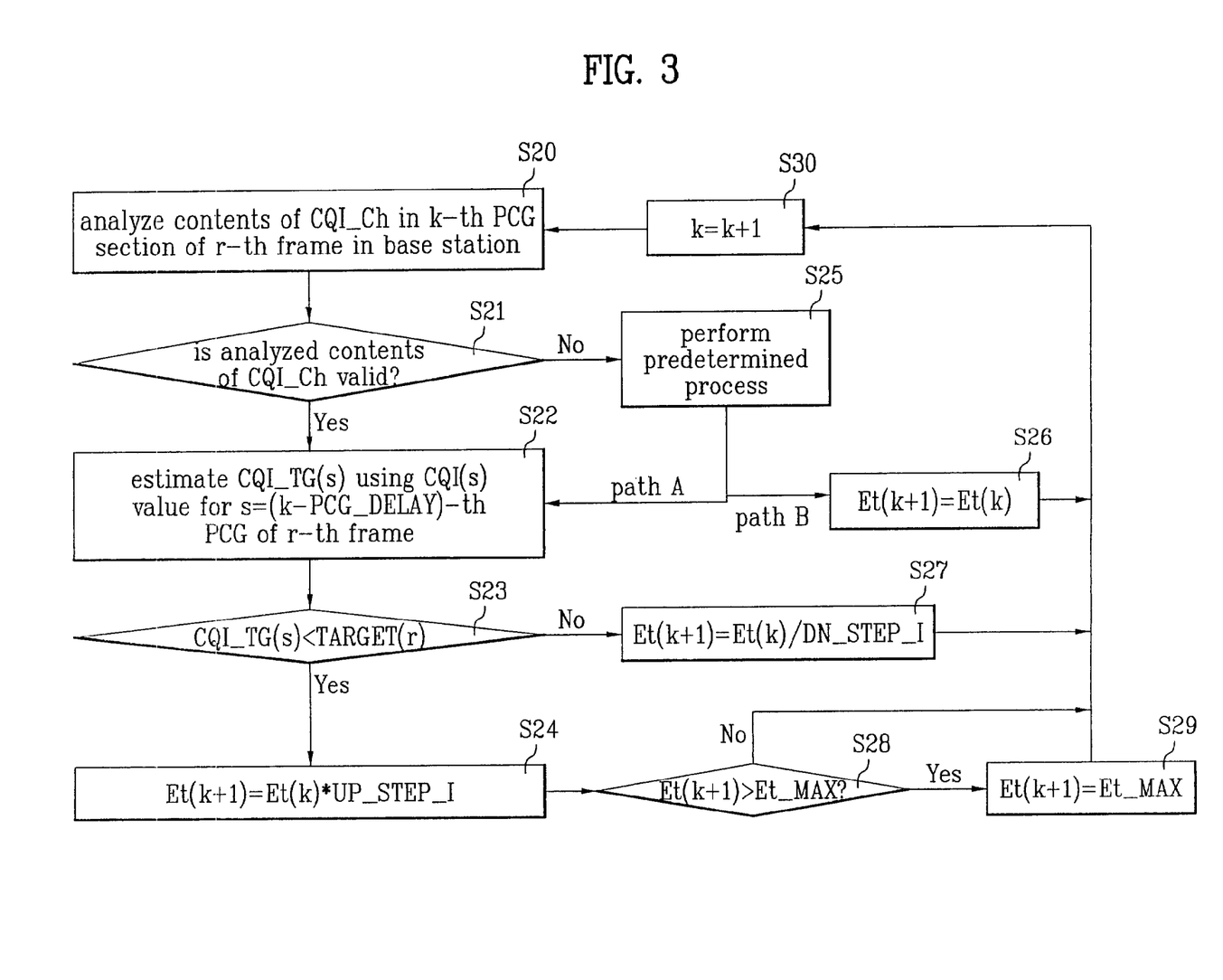
FIG. 3 is a flowchart illustrating a power control procedure of a base station according to a preferred embodiment of the present invention.
Figure 4:
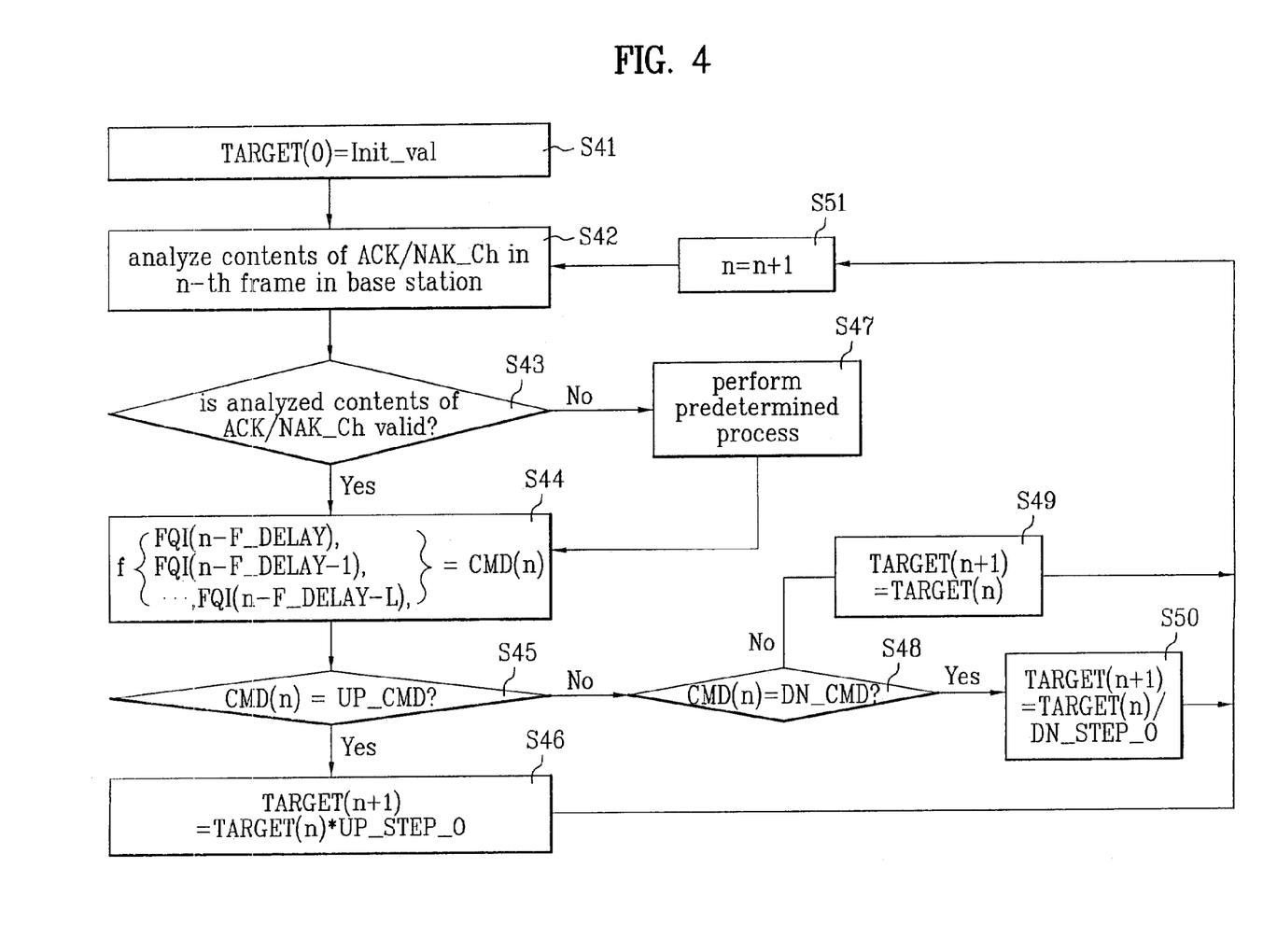
FIG. 4 is a flowchart illustrating a power control procedure of a base station according to another preferred embodiment of the present invention.

The base station that receives the channel quality information on communicative environment of a radio channel and the frame quality information performs the power control according to the procedures of FIGS. 3 and 4.

FIG. 3 is a flowchart illustrating a power control procedure of a base station according to a preferred embodiment of the present invention.

FIG. 3 shows the operation of the base station for performing the inner loop power control. The operation is performed only in case that CQI_Ch (or channel having the similar role) exists.

In FIG. 3, TARGET(r) is a target value of the quality condition of CH_P or CH_PA used in the base station.

Et(k) is a power value necessary for transmitting CH_P or CH_PA during a transmission of the k-th PCG, the value is determined by the base station.

PCG_DELAY means a delay taken while the base station transmits data through CH_P or CH_PA, the mobile station transmits channel quality information (hereinafter, CQI) on a communicative environment between mobile station and base station through the corresponding CQI_Ch to the base station, and then the base station receives the CQI through CQI_Ch.

Specifically, information on the CQI_Ch used for controlling a power of a transmission period of k-th PCG of one frame on CH_P (or CH_PA), through which data will be transmitted to the mobile station from the base station, is based on the information the (k-PCG_DELAY)-th PCG of one frame on CH_A. In other words, for the power control in the k-th PCG of the frame to be transmitted, the channel quality information of a communicative environment for the PCG before PCG_DELAY is used.

Also, UP_STEP_I and DN_STEP_I are specified values determined, and mean the once increased amount and decreased amount of the transmission powers of CH_P or $CH_{13}PA$, respectively.

Also, Et_MAX means the maximum available amount of power to transmit CH_P or CH_PA.

As described above, if the CQI of FIG. 2 is transmitted from the mobile station to the base station through CQI_Ch on the radio link, as shown in FIG. 3, the base station analyzes information on the CQI_Ch received during the transmission period of the k-th PCG of the r-th frame (step S20).

If it is determined information on the CQI_Ch) received by the base station is valid, CQI_TG(s) is estimated using the value of CQI(s) of the s-th PCG (herein, s is k-PCG_DELAY) of the r-th frame (step S22). That is, the value of CQI_TG(s) is estimated using the value of CQI of the power control group before PCG_DELAY. The "effective" means that the CQI(k) is received by the base station without an error.

It is judged whether the estimated CQI_TG(s) is less than TARGET(r) (step S23), and if so, Et(k+1) is updated to 'Et(k)*UP_STEP_I' (step S24). That is, if the estimated CQI_TG(s) is less than TARGET(r), the transmission power in the k-th PCG is increased. However, if the estimated CQI_TG(s) is not less than TARGET(r), Et(k+1) is updated to 'Et(k)*DN_STEP_I' (step S27). That is, the transmission power in the k-th PCG is decreased.

At this time, the one increasing and decreasing of the transmission power may be performed in the predetermined ratio. Also, the number of comparison of CQI_TG(s) with TARGET(r) may be adjusted. Thus, a power control with at least one-step increasing or decreasing is possible in one PCG.

If Et(k+1) is updated to 'Et(k)*UP_STEP_I', it is judged whether Et(k+1) is greater than Et_MAX (step S28), and if so, Et(k+1) is updated to Et_MAX (step S29) to prevent the transmission power from exceeding the determined maximum transmission power. However, if Et(k) is not greater than Et_MAX, Et(k+1) is kept the value of 'Et(k)*UP_STEP_I', and the power control in the following PCG is performed.

The above-described processes (steps S20 to S29) are repeatedly performed for other following PCGs.

Meanwhile, another process (step S25) in FIG. 3 indicates an operation of the base station when information on the CQI_Ch received by the base station is not valid or effective. This operation may be predetermined by the base station. The base station may perform procedures along with path A or path B. For example, in case of the path A, the transmission power during a transmission period of the corresponding PCG is determined using the value of CQI(s−1) used for the previous PCG as it is shown in equation 2. In case of the path B, the transmission power during a transmission period of the corresponding PCG is determined using the transmission power of the previous PCG as it is.

$$CQI(s)=CQI(s-1) \quad \text{[Equation 2]}$$

If equation 1 is used for CQI(k) in FIG. 2, CQI_TG(s) in FIG. 3 may be expressed as the following equation 3. At this time, TARGET(r) is the target value of a ratio of the signal to noise signal power, and CQI_TG(s) is a ratio of the signal to noise signal power in the PCG before PCG_DELAY, the CQI_TG(s) is used as a parameter for determining the transmission power in the present PCG.

$$CQI\_TG(s) = \frac{CQI(s)}{Ep(s)} Et(s) \quad \text{[Equation 3]}$$

Specifically, in equation. 3, the CQI_TG(s) is estimated using the value of CQI(s) and the transmission power Ep(s) of the pilot channel before the PCG_DELAY, and the transmission power Et(s) before the predetermined transmission periods on PCGs on the channel through which data is currently transmitted.

FIG. 4 is a flowchart illustrating a power control procedure of a base station according to another preferred embodiment of the present invention.

FIG. 4 shows the operation of the base station for performing the outer loop power control. The operation is performed only in case that ACK/NAK_Ch (or channel having the similar role) exists.

In FIG. 4, Init_val is an initial value of TARGET(0), and F_DELAY means a delay taken while the based station transmits data through CH_P (or CH_PA) including information used for detecting frame quality information(hereinafter, FQI) such as CRC, the mobile station transmits the FQI through the corresponding ACK/NAK_Ch to the base station, and then the base station receives the FQI through ACK/NAK_Ch.

Specifically, FQI(k) belonging to the k-th frame of ACK/NAK_Ch received by the base station includes the information on the frame quality of the (n-F_DELAY)-th frameon CH_P(or CH_PA) received by the base station. In other words, for the change of the target value for the power control of n-th frame on CH_P or CH_PA, the base station uses the predetermined number of values of frame quality information received effectively (i.e., FQI values) among the values of frame quality information before F—DELAY. At this time, it is assumed that the values of the frame quality information effectively received by the base station are used.

UP_STEP_0 and DN_STEP_0 are specified values determined, and mean the once increased amount and decreased amount of TARGET(r), respectively.

CMD(n) are values determined by a certain function having effective values of FQIs for the previous frames before F_DELAY in the following equation 4. For example, CMD(n) may have three kinds of values as given in the following equation 4.

$$f(FQI(n\text{-}F\_DELAY), FQI(n\text{-}F\_DELAY\text{-}1), \ldots, FQI(n\text{-}F\_DELAY\text{-}L))=CMD(n) \quad \text{[Equation 5]}$$

$$CMD(n) \in \{UP\_CMD, DN\_CMD, NO\_CMD\} \quad \text{[Equation 5]}$$

In equation 4, L is a variable related to the number of values of the previous FQIs used to generate the present CMD(n). The following equation 6 is an example of the equation 4 in case that L is 0.

$$f(FQI(n\text{-}F\_DELAY))=CMD(n)=UP\_CMD, \text{ if } FQI(n\text{-}F\_DELAY)=nak\_sig \; DN\_CMD, \text{ if } FQI(n\text{-}F\_DELAY)=ack\_sig \quad \text{[Equation 6]}$$

At this time, UP_CMD means a command to increase the target value for the power control, DN_CMD to decrease the target value for the power control, and NO_CMD to maintain the target value for the power control.

Referring to FIG. 4, TARGET(0) is set to the value of Init_val (step S41).

As described above, if FQI(n) that is the quality information of the frame is transmitted to the base station through ACK/NAK_Ch on the radio link, the base station analyzes the FQT(n) on the n-th frame of ACK/NAK_Ch (step S42).

It is judged whether the value of FQI(n), are effectively received (step S43) based on the analysis, and CMD(n) is obtained by the equation 4 using the effective values of FQIs of previous frames before F_DELAY (step S44).

It is judged whether CMD(n) obtained by the equation 4 is identical with UP_CMD (step S45), and if so, TARGET(n+1) is updated to 'TARGET(n)*UP_STEP_0' (step S46). That is, the target value for the power control is increased in a predetermined ratio. However, if CMD(n) is not identical with UP_CMD, it is judged again whether CMD(n) is identical with DN_CMD(n) (step S48), and if so, TARGET(n+1) is updated to 'TARGET(n)/DN_STEP_0' (step S50). That is, the target value for the power control is decreased in a predetermined ratio.

However, if CMD(n) is not identical with DN_CMD(n) at step S48, 'TARGET(n)' that is the target value for the power control in the previous frame is used as TARGET(n+1) (step S49).

The above-described processes (steps S41 to S50) are repeatedly performed with respect to the following frames.

Meanwhile, another process (step S47) in FIG. 4 indicates an operation of the base station performed if the value of FQI(n) is not effectively received. For example, equation 4 can be determined as the following equation 7. This operation may be predetermined by the base station.

$$CMD(n)=NO\_CMD \quad \text{[Equation 7]}$$

In FIG. 4, after upper/lower limit values of TARGET(n+1) are determined, if the value of TARGET(n+1) becomes higher than the upper limit value, the value of TARGET(n+1) may be determined as the upper limit value, while if the value of TARGET(n+1) becomes lower than the lower limit value, the value of TARGET(n+1) may be determined as the lower limit value.

Figure 5:
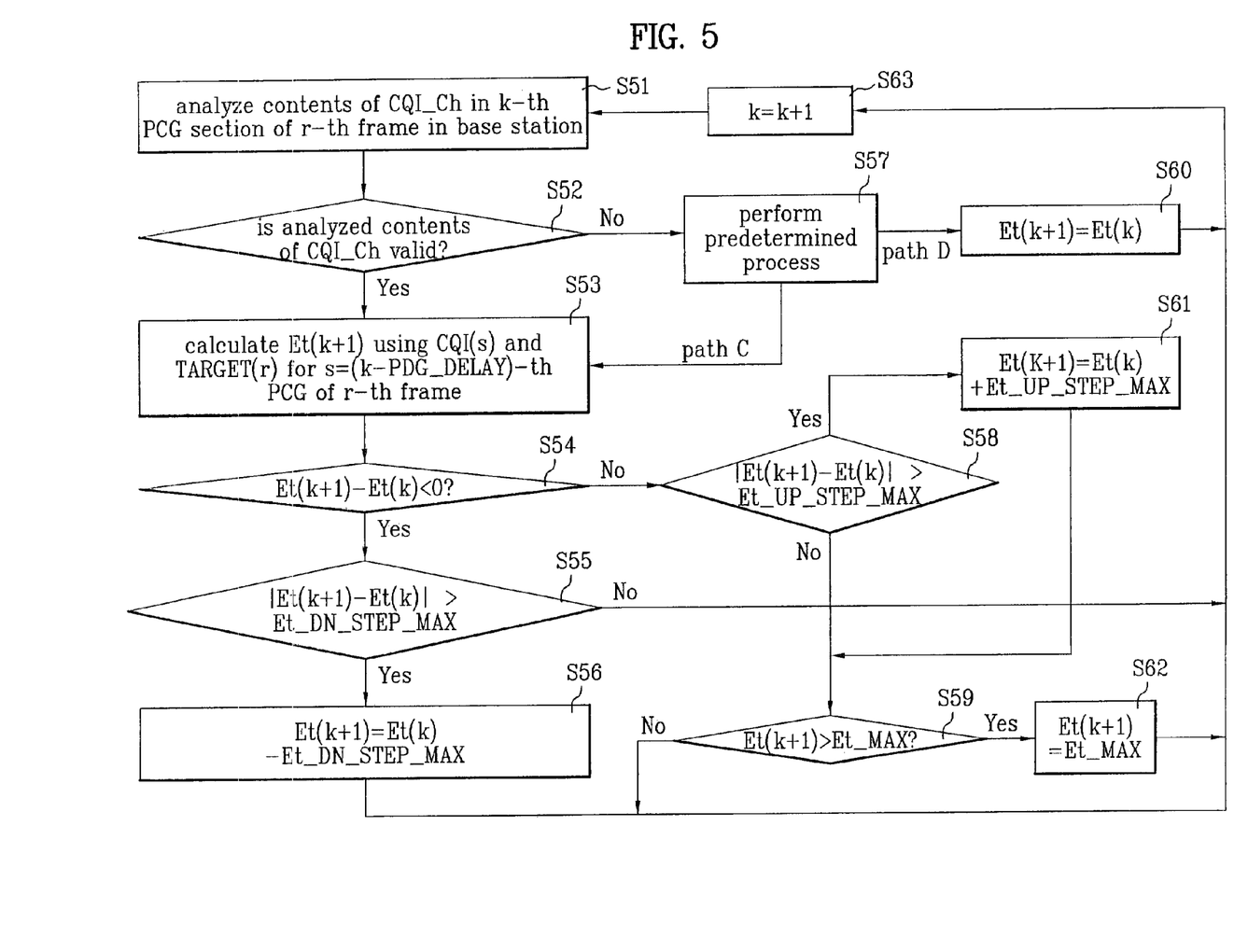
FIG. 5 is a flowchart illustrating a power control procedure of a base station according to still another preferred embodiment of the present invention.

FIG. 5 is a flowchart illustrating a power control procedure of a base station according to still another preferred embodiment of the present invention.

FIG. 5 shows another operation of the base station for performing the inner loop power control. This operation is performed only in case that CQI_Ch (or channel having the similar role) exists.

Referring to FIG. 5, Et_UP_STEP_MAX and Et_DN_STEP_MAX are specified values, and mean the once maximum increased amount and maximum decreased amount of the transmission power of CH_P or CH_PA, respectively.

As described above, if CQI information of FIG. 2 is transmitted to the base station through CQI_Ch on the radio link, as shown in FIG. 5, the base station analyzes information on the CQI_Ch received during the transmission period of k-th PCG of r-th frame on CQI_Ch (step S51).

It is judged whether the value of CQI(k), are effectively received (step S52), and if so, Et(k+1) is calculated using the effective value of CQI(s) and the value of TARGET(r) during a transmission period of the s-th PCG (herein, s is k-PCG_DELAY) of the r-th frame (step S53).

It is judged whether the difference between the calculated value of Et(k+1) and the value of Et(k) is less than 0 (step S54), and if so, it is judged again whether the absolute value of the difference between the values of Et(k+1) and Et(k) is greater than Et_DN_STEP_MAX (step S55). If so, Et(k+1) is updated to 'Et(k)-Et_DN_STEP_MAX' (step S53). That is, if the value is decreased below the maximum decreased value set in the system, the calculated value of Et(k+1) is updated by subtracting the maximum decreased amount from Et(k) of the previous PCG.

However, if the difference between the calculated value of Et(k+1) and the value of Et(k) is not less than 0, it is judged again whether the absolute value of the difference between the values of Et(k+1) and Et(k) is greater than Et_UP_STEP_MAX (step S58). If so, Et(k+1) is updated to 'Et(k)+Et_UP_STEP_MAX' (step S61). That is, if the value is increased above the maximum increased value set in the system, the calculated value of Et(k+1) is updated by adding the maximum increased amount to Et(k) of the previous PCG.

At step S58, if the absolute value of the difference between the values of Et(k+1) and Et(k) is not greater than Et_UP_STEP_MAX, it is judged again whether the calculated Et(k+1) or the Et(k+1) updated to 'Et(k)+Et_UP_STEP_MAX' at step S61 is greater than Et_MAX (step S59), and if so, Et(k+1) is updated to Et_MAX (step S62).

That is, if Et(t+1) finally determined as described above is greater than the maximum transmission power Et_MAX the finally determined Et(k+1) is updated to Et_MAX (step S62).

The above-described processes (steps S51 to S62) are repeatedly performed for the following PCGs after the k-th PCG section of the r-th frame of the base station.

In FIG. 5, the number of updating Et(k) may be adjusted.

In FIGS. 3 and 5, the minimum value Et_MIN of Et(k) maybe determined, and if Et(k) is less than the minimum value Et_MIN, it may be determined that Et(k)=Et_MIN.

Meanwhile, another process (step S57) indicates an operation of the base station performed if the value of CQI(k) is not effectively received, and may be performed along with path C or path D. Herein, this operation may be predetermined by the base station. For example, in case of the path C, the transmission power during a transmission period of the present PCG is calculated using the value of CQI(s) of the previous PCG as shown in equation 2. In case of the path D, the transmission power of the previous PCG is used as it is.

If the equation 1 is used for CQI(s) in FIG. 2, Et(k+1) in FIG. 5 is expressed as the following equation 8, and at this time, TARGET(r) will be the target value of a ratio of the signal to noise signal power.

$$Et(k+1)=(CQI(s)/Ep(s))^{-1}TARGET(r)$$ [Equation 8]

As described above, according to the present invention, an efficient power control is possible, and a better receiving quality can be expected using the same amount of power during the transmission of the physical channel, that is, the same receiving quality can be expected using smaller transmission power. As a result, the power consumption of the transmitting end can be greatly reduced to effect the cost reduction.

It will be apparent to those skilled in the art than various modifications and variations can be made in the present invention. Thus, it is intended that the present invention covers the modifications and variations of this invention provided they come within the scope of the appended claims and their equivalents.

What is claimed is:

1. A method for adjusting a power of a forward link signal at a base station, comprising:
   receiving at the base station a first channel quality value from a mobile station, the first channel quality value being based on a forward link reference signal on a supplementary channel received by the mobile station while at least one first power control group of a forward link on a forward link channel is received by the mobile station;
   estimating a parameter for determining a transmission power of the forward link signal using at least one second channel quality value for at least one second power control group that is in a position in a time axis before a predetermined time from a position of the first power control group that is used for the first channel quality value;
   comparing the estimated parameter with a target value; and
   adjusting the transmission power of the second power control group of the forward link signal according to the comparing result by the base station, wherein a transmission power of the supplementary channel for the link reference signal is higher than the transmission power of the forward link signal.

2. The method of claim 1, further comprising:
   if the parameter is less than the target value, increasing the transmission power of the second power control group of the forward link signal; and
   if the parameter is not less than the target value, decreasing the transmission power of the second power control group of the forward link signal.

3. The method of claim 2, further comprising:
   if the increased power is greater than an upper limit value, replacing the increased power with the upper limit value.

4. The method of claim 2, further comprising:
   if the decreased power is less than a lower limit value, replacing the decreased power with the lower limit value.

5. The method of claim 2, wherein the power increase and the power decrease are performed in a predetermined ratio.

6. The method of claim 1, wherein the target value corresponds to a ratio of a signal power to a noise signal power.

7. The method of claim 1, wherein the supplementary channel is a forward link pilot channel, and the first channel quality value is a ratio of a forward pilot signal power to noise signal power.

8. The method of claim 1, wherein the parameter is estimated by using the second channel quality value, a transmission power of the forward link reference signal, and a transmission power of the forward link signal, for the second power control group that is in the position before the predetermined time from the position of the first power control group that is used for the first channel quality value.

9. The method of claim 8, wherein the predetermined time indicates a delay taken while the forward link reference signal is transmitted and the first channel quality value is received in response to the forward link reference signal.

10. The method of claim 1, wherein if the first channel quality value is not valid, the transmission power of the second power control group is adjusted by using a parameter for a previous power control group.

11. The method of claim 1, wherein if the first channel quality value is not valid, the transmission power of the second power control group is adjusted as a transmission power of a previous power control group of the forward link signal.

12. The method of claim 1, wherein the forward link signal is transmitted through a physical channel.

13. The method of claim 12, wherein the forward link signal includes information used for detecting a frame quality of a frame on the physical channel.

14. A method of adjusting a power of a forward link signal at a base station, comprising:
   receiving a first channel quality value at the base station from a mobile station, the first channel quality value being based on a forward link reference signal on a supplementary channel received by the mobile station while at least one first power control group of a forward link signal on a forward link channel is received b the mobile station;
   judging whether the first channel quality value is valid or not;
   estimating a transmission power of the forward link signal using a parameter of at least one valid second channel quality value of at least one second power control group that is in a position in a time axis before the predetermined number of power control groups from a position of the first power control group, and a target value used to control a power of the forward link signal, when the first channel quality value is valid;
   comparing a changing amount from a previous transmission power to the estimated transmission power with an upper changeable amount or a lower changeable amount; and
   determining by the base station a transmission power of the second power control group of the forward link signal according to the comparing result,
   wherein a transmission power of the supplementary channel for the forward link reference signal is higher than the transmission power of the forward link signal.

15. The method of claim 14, wherein the determining comprises:
   if the changing amount is less than the upper changeable amount or the lower changeable amount, determining the estimated transmission power as the transmission power of the second power control group.

16. The method of claim 14, wherein the determining comprises:
   if the estimated transmission power is greater than an upper limit value, determining the upper limit value as the transmission power of the second power control group; and
   if the estimated transmission power is less than a lower limit value, determining the lower limit value as the transmission power of the second power control group.

17. The method of claim 14, wherein the determining comprises:
   determining the transmission power of the second power control group as a transmission power of a previous power control group, when the first channel quality value is not valid.

18. The method of claim 14, wherein the determining comprises:
   determining the transmission power of the second power control group as a transmission power estimated using the parameter of a previous power control group, when the first channel quality value is not valid.

19. The method of claim 14, wherein the target value corresponds to a ratio of a signal power to noise signal power.

20. The method of claim 14, wherein the forward link reference signal is a pilot signal and the first channel quality value corresponds to a ratio of the pilot signal power to noise signal power.

21. The method of claim 14, wherein the predetermined number of the power control groups indicates a delay taken while the forward link reference signal is transmitted, the first channel quality value is received in response to the forward reference signal.

22. The method of claim 14, wherein the forward link signal includes information used to detect a frame quality of a frame on the physical channel.

23. The method of claim 14, wherein the transmission power is estimated using the at least one valid received first channel quality value, a target value, a transmission power of the forward link reference signal, before the predetermined number of power control groups.

* * * * *